United States Patent [19]

Brioni et al.

[11] Patent Number: 5,725,738
[45] Date of Patent: Mar. 10, 1998

[54] METHOD AND APPARATUS FOR PRODUCING WOOD CHARCOAL BY PYROLYSIS OF WOOD-LIKE PRODUCTS OR VEGETABLE BIOMASSES IN GENERAL

[76] Inventors: Osvaldo Brioni, Via Dante, 3, 24030 Solza (prov. of Bergamo); Dario Buizza, Via Ugo Foscolo, 28, 25035 Ospitaletto (prov. of Brescia), both of Italy

[21] Appl. No.: 600,636

[22] Filed: Feb. 13, 1996

[30] Foreign Application Priority Data

Nov. 10, 1995 [IT] Italy ............... MI95A2324 U

[51] Int. Cl.[6] ............... C10B 53/02; F23G 5/027
[52] U.S. Cl. ............... 201/14; 201/32; 202/117; 110/257; 110/293
[58] Field of Search ............... 201/13, 32, 14, 201/15; 202/117; 110/228, 257, 293, 294

[56] References Cited

U.S. PATENT DOCUMENTS

| | | | |
|---|---|---|---|
| 3,877,398 | 4/1975 | Ochi et al. | 110/257 |
| 3,887,437 | 6/1975 | Osman et al. | 202/117 |
| 3,945,890 | 3/1976 | Kemp | 201/14 |
| 3,971,705 | 7/1976 | Norita et al. | 201/32 |
| 4,340,444 | 7/1982 | Roma | 201/32 |
| 4,344,820 | 8/1982 | Thompson | 201/15 |
| 4,738,753 | 4/1988 | Corato et al. | 201/32 |
| 4,759,300 | 7/1988 | Hansen et al. | 110/257 |
| 4,944,236 | 7/1990 | Sheen | 110/257 |
| 5,114,542 | 5/1992 | Childress et al. | 201/15 |

Primary Examiner—Thomas G. Wyse

[57] ABSTRACT

A method and apparatus for producing wood charcoal by pyrolysis of wood products or vegetable biomasses in general, the method including the steps of: loading the wood products, or vegetable biomasses in general, onto transport trolleys; introducing the trolleys, which contain the wood products, in a treatment tunnel wherein a pyrolysis chamber is formed; indirectly heating the wood products inside the pyrolysis chamber until pyrolysis of the wood products is obtained, with continuous extraction, from the pyrolysis chamber, of the gas generated by the pyrolysis process; and extracting the trolleys from the tunnel to unload from the trolleys the charcoal that constitutes the residue of the pyrolysis of the wood products.

34 Claims, 4 Drawing Sheets

METHOD AND APPARATUS FOR PRODUCING WOOD CHARCOAL BY PYROLYSIS OF WOOD-LIKE PRODUCTS OR VEGETABLE BIOMASSES IN GENERAL

BACKGROUND OF THE INVENTION

The present invention relates to a method and an apparatus for producing wood charcoal by pyrolysis of wood-like products or vegetable biomasses in general.

Facilities of the "Lambiotte" type or the like are currently used for producing, at the industrial level, wood charcoal starting from wood products.

These facilities are generally constituted by a large cylindrical retort made of metal plate, with a diameter that can vary between 1.75 and 3 meters and a height that can vary between 20 and 22 meters. The wood products are loaded at the upper end of the cylindrical retort and are heated by the fumes of an external furnace, which enter the cylindrical retort in an intermediate region of its vertical extension. The mixture of distillation products and fumes exits from the retort proximate to the upper end and is sent to appropriate condensation systems, where the condensable vapors are separated from the non-condensable gases which, at the output of the condensation system, are sent back to the external furnace so that they can be reused to provide energy to support the process.

The lowermost part of the cylindrical retort constitutes the charcoal cooling region; said charcoal is dropped intermittently into trolleys that pass below the cylindrical retort.

The operation of these facilities is continuous with wood products formed by cylindrical pieces having a diameter of 8–12 cm or a side dimension of 15 to 20 cm; with facilities using a cylindrical retort measuring 1.75 m in diameter, it is possible to produce approximately 300 quintals of charcoal per day, keeping the wood products inside the retort for approximately 12 hours.

These facilities, however, are not free from problems and drawbacks.

These problems arise mainly from the fact that these facilities, like other conventional facilities, follow a carbonization method that utilizes the principle of partial combustion of the wood products in vertical retorts, consequently penalizing the efficiency of the facility.

Furthermore, for correct operation of these facilities, the wood that is introduced must have specific geometrical features, such as to facilitate its descent inside the retort, and a very low moisture content to allow its carbonization. Accordingly, these requirements force expensive processing of the raw material to reduce it into small pieces and the adoption of an additional drying oven to reduce the moisture to the levels that are indispensable for executing the process. Analysis of the facilities and processes currently being used to produce charcoal starting from wood products has pointed out the following limitations: high specific consumption of wood per unit of charcoal obtained;

low production capacity, caused by the size limitations of continuous vertical ovens;

expensive processing of the wood to reduce it to the physical conditions required by the process (size and humidity);

low overall thermal efficiency, linked to carbonization with direct heat generated by the partial combustion of the wood and of its organic emissions, a considerable part whereof is eliminated uselessly;

poor operating flexibility as regards the carbonization process parameters;

considerable ecologic problems, caused by the volatile pyroligneous products and by the large amount of charcoal dust generated;

difficult maintenance, caused by the considerable height of the installations;

high consumptions of electric power for the pretreatment of the wood and subsequently for its vertical transport in the drying and carbonization ovens;

very high specific investment per unit of product; and low flame temperatures (700°–800° C.) during combustion of the pyrolytic products. Accordingly, thermal applications such as the production of electric power, "cracking" of pyrolytic products, etcetera, become more difficult.

SUMMARY OF THE INVENTION

A principal aim of the present invention is to solve the problems described above by providing a method for producing wood charcoal by pyrolysis of wood products, or vegetable biomasses in general, that is capable of sustaining itself energywise and avoids even partial combustion of the raw material.

Another aim of the invention is to provide a method that considerably simplifies, with respect to conventional charcoal production processes, the operations for energy recovery and optionally for purifying the gases released by the wood products during pyrolysis.

Another aim of the invention is to provide a method having a high overall thermal efficiency.

Another aim of the invention is to provide an apparatus that allows to produce charcoal starting from wood products, even considerably large ones, without having to resort to expensive operations for pretreating the wood products.

Another aim of the invention is to provide a facility that can be produced and installed, as well as subjected to maintenance interventions, in an extremely simpler and quicker manner than conventional charcoal production apparatuses.

Another aim of the invention is to provide a method and an apparatus that allow to produce wood charcoal with an extremely low emission of pollutants into the atmosphere and in any case at such levels as to be considerably lower than the limits prescribed by applicable statutory provisions for environmental protection.

According to one preferred aspect of the invention, there is provided a method for producing wood charcoal by pyrolysis of wood products, or vegetable biomasses in general, characterized in that it comprises: a step for loading the wood products onto transport trolleys; a step for introducing said trolleys, which contain the wood products, into a treatment tunnel wherein a pyrolysis chamber is formed; a step for the indirect heating of the wood products inside said pyrolysis chamber until pyrolysis of the wood products is obtained, with continuous extraction, from said pyrolysis chamber, of the gas generated by the pyrolysis process; and a step for the extraction of the trolleys from said tunnel to unload from the trolleys the charcoal that constitutes the residue of the pyrolysis of the wood products.

The execution of the method according to the invention preferably utilizes an apparatus comprising: a treatment tunnel; means for moving, along said tunnel, the trolleys for loading the wood products to be treated; means for separating the inside of said tunnel from the outside environment; at least one pyrolysis chamber being formed in said tunnel and being provided with means for the indirect heating of the wood products introduced in said pyrolysis chamber to a temperature adapted to achieve pyrolysis of the wood products; and means for extracting the gas generated by the pyrolysis process from said pyrolysis chamber.

BRIEF DESCRIPTION OF THE DRAWINGS

The characteristics and advantages of the invention will become apparent from the following detailed description of some preferred but not exclusive embodiments of the method and apparatus according to the invention, described and illustrated in the accompanying drawings only by way of non-limitative example, wherein.

DESCRIPTION OF THE PREFERRED EMBODIMENTS

With reference to the above figures, an apparatus for producing wood charcoal, generally designated by the reference numeral 1, comprises a treatment tunnel 2 lying preferably on a horizontally plane and in a substantially U-shaped arrangement, so as to have an inlet 3 and an outlet 4 that are arranged on a same side.

The apparatus comprises means for moving trolleys 5 along the tunnel 2; the wood products to be treated are loaded into said trolleys.

The means for moving the trolleys 5 inside the tunnel 2 preferably comprise rails 6, which run axially along the two arms 2a and 2b of the tunnel 2, and a beam 7a and 7b for each one of the two arms of the tunnel 2; each beam is slidingly accommodated in a respective seat 8 extending along the bottom of the tunnel between the rails 6.

Each beam 7a and 7b is slidably actuatable with a reciprocating motion, for example by means of fluid-actuated cylinders 9a and 9b that are actuatable on command, parallel to the extension of the corresponding arm of the tunnel 2 in which it is accommodated.

Moreover, each beam 7a and 7b is provided with sets of locators or pushers 10a and 10b that can be extracted on command in an upward direction from the beam 7a and 7b, for example by means of fluid-actuated cylinders 11a, 11b, 12a, 12b, to be engaged or disengaged with respect to the trolleys 5 arranged on the rails 6.

In practice, the advancement of the trolleys 5 along the tunnel 2 is performed in an intermittent fashion through the combined actuation of the fluid-actuated cylinders 9a and 9b, which cause the reciprocating motion of the beams 7a and 7b along the tunnel, and of the fluid-actuated cylinders 11a, 11b, 12a, 12b, which engage and disengage the locators 10a and 10b with the trolleys, transmitting the translatory motion of the beam to the trolleys.

A device for transferring the trolleys from the rails arranged along the arm 2a of the tunnel to the rails arranged on the arm 2b is provided along the transverse portion 2c that joins the two parallel arms 2a and 2b of the tunnel 2, said device being constituted for example by a movable platform 13 for supporting the trolleys.

The transfer of the movable platform 13 from one arm of the tunnel to the other can be achieved for example by means of a fluid-actuated cylinder 14 acting on the movable platform 13, causing its reciprocating movement along a direction lying at right angles to the main dimension of the two parallel arms 2a and 2b of the tunnel 2.

A drying and preheating chamber 20, a pyrolysis chamber 21, and a cooling chamber 22 are formed in the tunnel 2 starting from the inlet 3 and along the direction 100 in which the trolleys 5 advance along the tunnel 2; said pyrolysis chamber is divided into a first section, located in the arm 2a of the tunnel, and into a second section, located in the arm 2b of the tunnel.

A plurality of guillotine doors are preferably provided between the inlet 3 and the pyrolysis chamber 21, so that during the operation of the apparatus any direct connection of the pyrolysis chamber 21 to the outside is safely prevented.

Preferably, at the inlet of the drying and preheating chamber 20 there is a first compartment 24 for containing a trolley 5 and separated from the outside environment and from the remaining part of the chamber 20 by two guillotine doors 25 and 26 that are opened and closed for example through fluid-actuated cylinders 27 and 28.

At the end of the drying and preheating chamber 20 a second compartment 29 is provided which has the same dimensions as the compartment 24 and is separated from the remaining part of the chamber 20 and from the pyrolysis chamber 21 by guillotine doors 30 and 31, the opening whereof is actuated by fluid-actuated cylinders 32 and 33, like the guillotine doors 25 and 26.

At the exit of the pyrolysis chamber 21, that is to say, at the beginning of the cooling chamber 22, a third compartment 34 is advantageously provided which has the same dimensions as the compartments 24 and 29 and is separated from the remaining part of the cooling chamber 22 and from the pyrolysis chamber 21 by guillotine doors 35 and 36 that are actuated by fluid-actuated cylinders 37 and 38.

Likewise, at the end of the cooling chamber 22 a fourth compartment 39 is conveniently provided which is separated from the outside environment and from the remaining part of the cooling chamber 22 by guillotine doors 40 and 41 that are actuated by fluid-actuated cylinders 42 and 43.

At least two sets of locators or pushers 10a and 10b are provided along each arm of the tunnel 2, on the beam 7a or 7b, and are actuatable independently from one another by virtue of the fluid-actuated cylinders 11a, 12a, 11b, and 12b, so that the insertion of a trolley 5 in the inlet 3 of the tunnel occurs when the doors 25 and 31 are open and the doors 26 and 30 are closed, whereas the passage of the trolley from the first compartment 24 into the drying and preheating chamber 20, as well as the passage of the trolley into the second compartment 29, are performed when the doors 26 and 30 are open, after the closure of the doors 25 and 31. The same arrangement is provided on the other arm of the tunnel, so that the pyrolysis chamber 21 can never be directly connected to the adjacent environment. By virtue of this arrangement, combined with the presence of the compartments 24, 29, 34, and 39, the emission of pollutants into the outside environment is practically eliminated. Furthermore, the various regions into which the tunnel 2 is divided are never simultaneously connected to each other during the operation of the apparatus.

Figure 1:
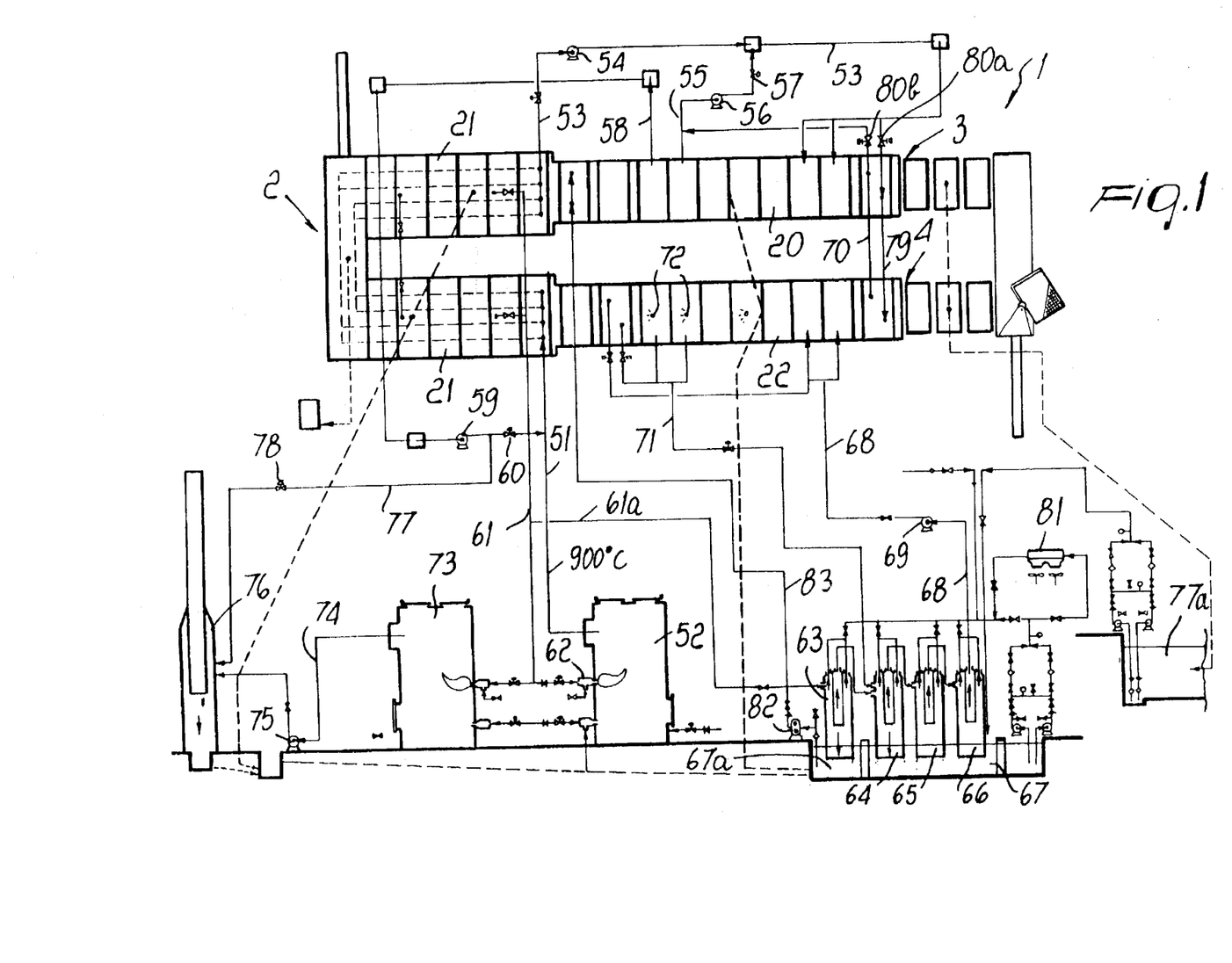
FIG. 1 is a diagram of an apparatus for producing wood charcoal according to a preferred embodiment of the invention.
Figure 2:
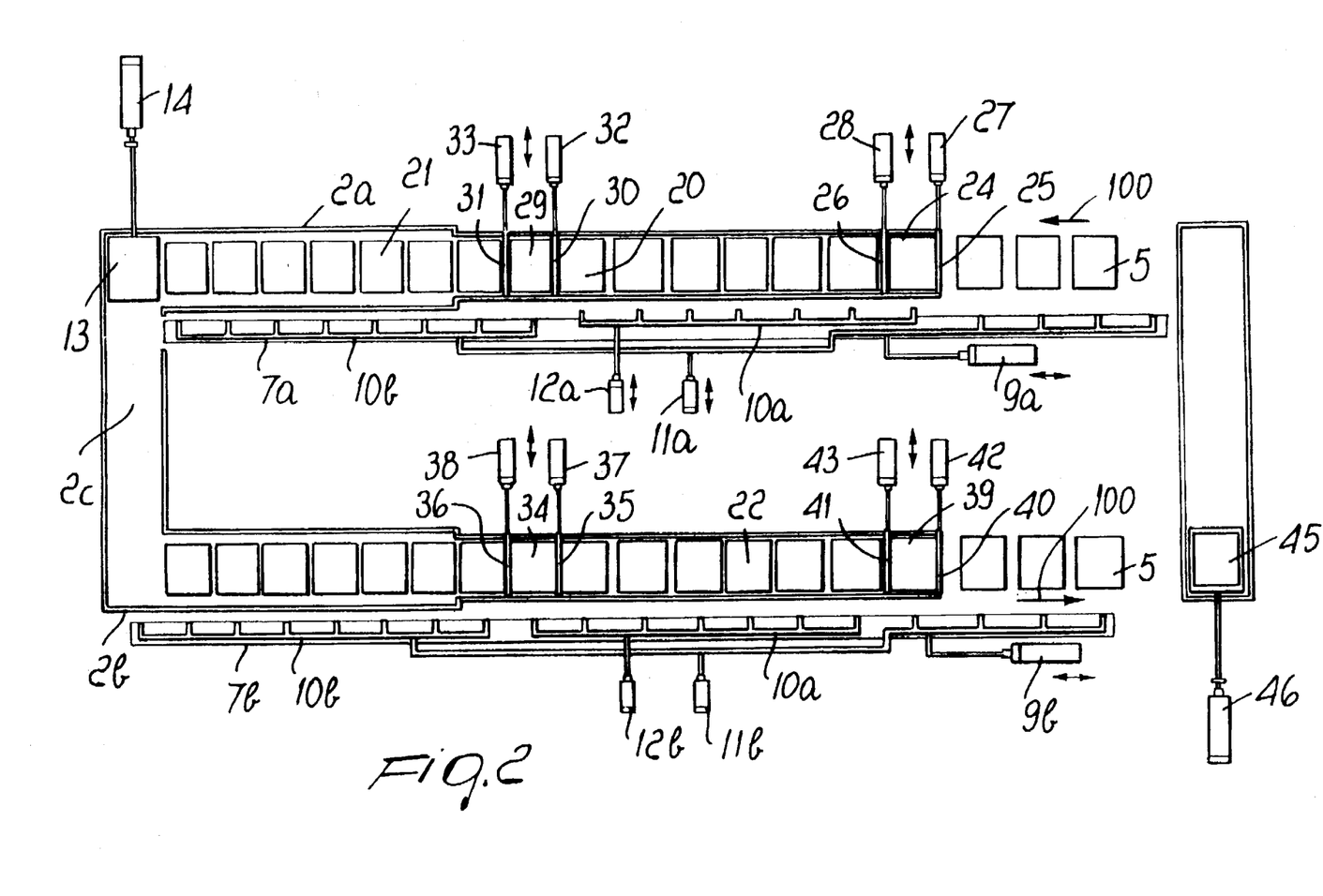
FIG. 2 is a schematic view of means for moving the wood product loading trolleys along the treatment tunnel.
Figure 3:
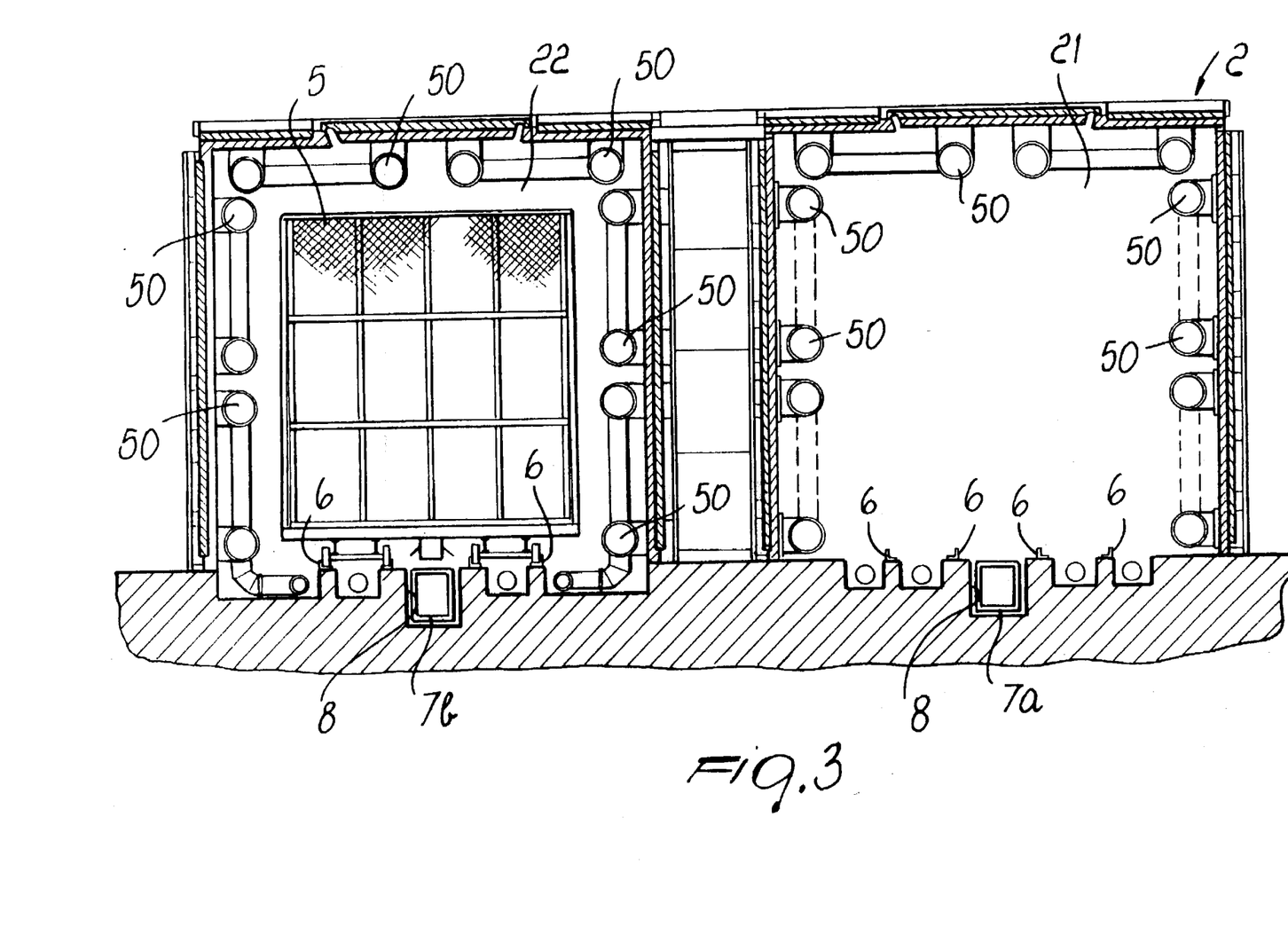
FIG. 3 is a schematic sectional view of the pyrolysis chamber, taken along a vertical plane.
Figure 4:
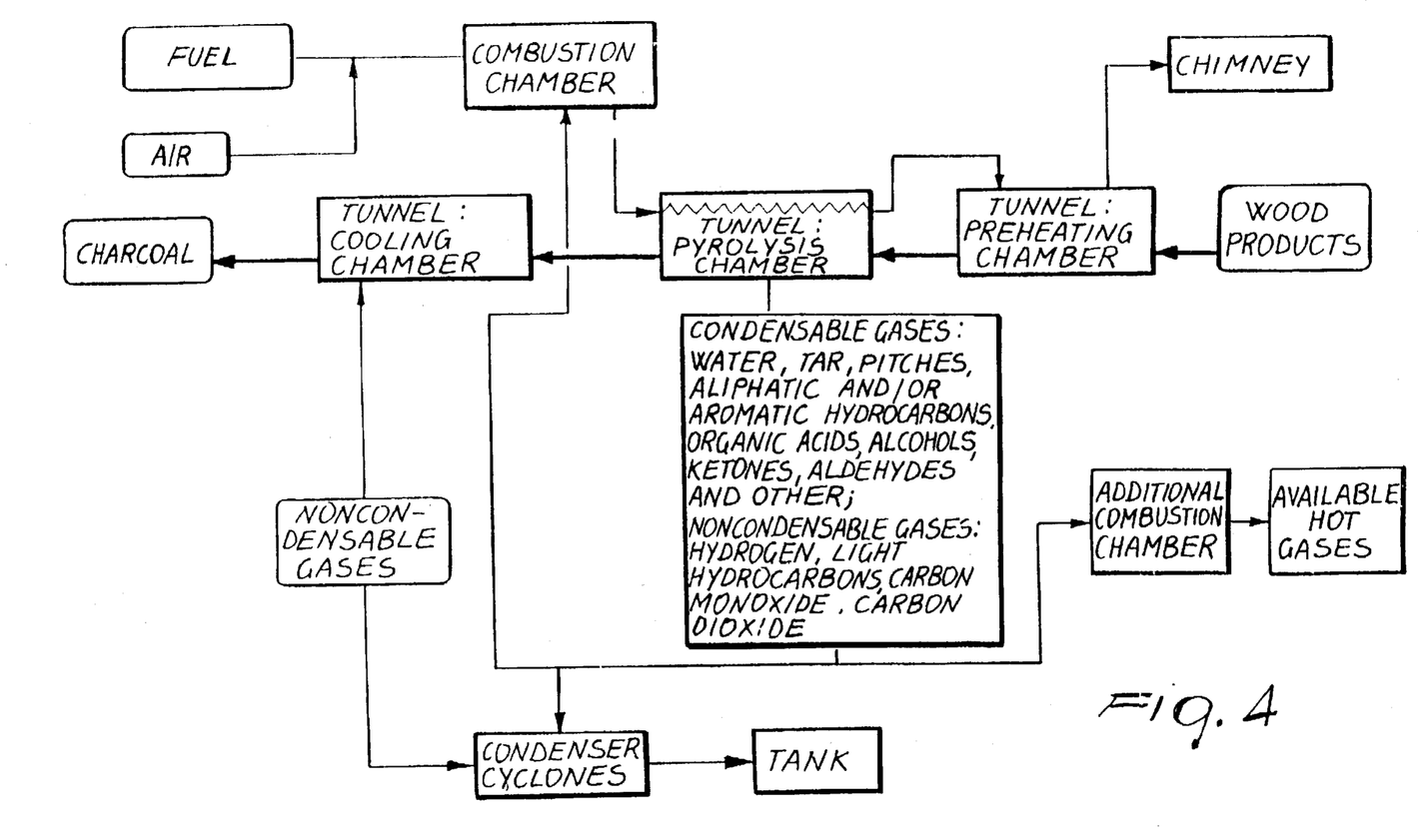
FIG. 4 is a general flowchart of a method for producing wood charcoal according to a preferred aspect of the invention.

For the sake of greater clarity, the doors that separate the various chambers formed in the tunnel 2, as well as the beams 7a and 7b with the corresponding locators 10a and 10b, have been shown on a plane that is rotated through 90° with respect to the actual plane of arrangement relative to the tunnel in FIG. 2. Furthermore, the beams 7a and 7b, as well as the locators 10a and 10b and the corresponding actuation elements, have been shown laterally adjacent to the two arms 2a and 2b of the tunnel shown in plan view.

Proximate to the inlet 3 and to the outlet 4 of the tunnel there is provided a device for transferring the trolleys 5 from the outlet towards the inlet; said transfer device is constituted for example by a movable platform 45 for supporting the trolleys that is actuated by a fluid-actuated cylinder 46.

The entire system for moving the trolleys and the doors is controlled by a control and monitoring element, for example a PLC, that supervises the movement of said elements according to a programmed sequence.

The apparatus according to the invention, in a preferred embodiment, is provided, inside the pyrolysis chamber 21, with means for the indirect heating of the wood products contained in the trolleys 5. Said indirect heating means are preferably constituted by radiating bodies 50, such as for example batteries of tubular bodies, which are supplied, through a duct 51, with the fumes of a combustion chamber 52.

The radiating bodies 50, at the exit of the pyrolysis chamber 21, are connected to a duct 53 provided with outlets arranged in the drying and preheating chamber 20. An aspirator 54 is arranged along the duct 53 and maintains the necessary flow of the fumes arriving from the combustion chamber 52 through the radiating bodies 50 and conveys the fumes, after passing through the radiating bodies 50, into the drying and preheating chamber 20. A first duct 55 is provided along the longitudinal extension of the drying and preheating chamber 20, and part of the gas, constituted by said fumes and by the water vapor generated by the heating of the wood products in the drying and preheating chamber 20, is conveyed through said duct 55 into the duct 53 and is then fed back into the drying and preheating chamber 20. An aspirator 56 is arranged along the duct 55, and the feeding of the gases arriving from the drying and preheating chamber 20 into the duct 53 is adjustable by means of a valve 57 so as to allow adjustment of the temperature of the fumes that are introduced in the drying and preheating chamber 20 through the duct 53 to avoid the combustion of the wood products.

A second duct 58 is provided along the longitudinal extension of the drying and preheating chamber 20 and is connected to the duct 51.

More particularly, an aspirator 59 and a valve 60 are arranged along the duct 58; by virtue of said valve, it is possible to adjust the flow-rate of the gases that are removed from the drying and preheating chamber 20 through the duct 58 and are, if necessary, partially fed into the duct 51, so as to allow to adjust the temperature of the fumes that arrive from the combustion chamber 52 and are fed into the radiating bodies 50; the excess part of the gases arriving from the duct 58 is sent to a cyclone chimney 76.

The apparatus according to a preferred aspect of the invention comprises means for extracting the gas generated by the pyrolysis process; said means are preferably substantially constituted by an extraction duct 61 provided with a plurality of inlets arranged in various regions of the pyrolysis chamber 21 and feeding the burner 62 arranged in the combustion chamber 52.

Along the extension of the duct 61 a branch 61a is provided, through which part of the gases arriving from the pyrolysis chamber 21 is optionally conveyed to a battery of condenser cyclones, designated by the reference numerals 63 to 66; the condensation produces a noncondensable gas, with a low oxygen content, that supplements any losses of the cooling gas.

The condenser cyclones 63–66 are connected to each other in series, so as to perform a gradual reduction of the temperature and therefore separate the condensable part from the noncondensable part of a partial amount of the gases produced by pyrolysis of the wood products.

The condensable part of said gases is recovered in a collection tank 67, whereas the cooled noncondensable part exits from the last condenser cyclone 66 through a duct 68, along which an aspirator 69 is provided that ensures the gas flow along the ducts 61 and 61a and conveys the noncondensable part, through branches of said duct 68, into the cooling chamber 22, in order to provide a stream of cooling gas that strikes the charcoal inside the trolleys in the cooling chamber 22.

The inlets of branches of a charcoal cooling gas collection duct 71 are located in the initial part of the cooling chamber 22; said duct 71 is connected to one of the inlets of the condenser cyclone 64.

It should be noted that in the cooling chamber 22 it is possible to provide cooling water sprayers 72 that can be supplied with the water taken from the tank 67.

The cooling water used for the condenser cyclones is in turn cooled by means of a set of air coolers 81.

Any tars collected in the portion 67a of the tank 67 can be separated and used, or can be fed back into the trolleys inside the tunnel 2, upstream of the pyrolysis chamber 21, through the pump 82 and the pipe 83 to be distilled again.

The cooling gas, to be conveyed into the cooling chamber 22, can also be obtained by using burnt gas generated within the process, such as for example the gas that leaves the radiating bodies, brought to the desired temperature by introducing micronized water into the extraction duct. The introduction of micronized water also reduces the oxygen content of said gas to less than 6%, making it practically inert.

The pressure inside the tunnel 2 is slightly higher than the pressure of the outside environment. The first compartment 24 and the last compartment 39 are kept at the equilibrium pressure, so as to avoid the escape of polluting gases and vapors, by virtue of the aspiration and feeding of exhaust gases through the pipes 70 and 79 controlled by the fan 56 and by the valves 80a and 80b.

The apparatus according to a preferred embodiment of the invention furthermore comprises an additional combustion chamber 73, wherein the gases produced by the pyrolysis of the wood products in the pyrolysis chamber 21 are subjected to combustion; said gases would be in excess with respect to the energy required to make the entire process self-sustaining. The fumes produced by the additional combustion chamber 73 can be used, for example, to heat water for hydraulic or sanitary uses, to generate electricity, or for other uses.

The discharge 74 of the additional combustion chamber 73, along which an aspirator 75 is arranged, is connected to the cyclone chimney 76.

The duct 58 for discharging the part of gas arriving from the drying and preheating chamber 20 in excess with respect to the demand for adjusting the temperature of the fumes introduced in the radiating bodies 50 is also connected to the cyclone chimney 76 through an additional duct 77 and a valve 78.

For the sake of completeness in description, it should be noted that the apparatus includes an additional tank 77a for collecting meteoric water, as well as for supplying the condenser cyclones 63–66.

The operation of the preferred embodiment of the apparatus, and a preferred method, according to the invention are as follows.

The trolleys 5, loaded with the wood products to be carbonized, are introduced in the tunnel 2 and moved intermittently forwards along the longitudinal extension of the tunnel 2.

During advancement inside the tunnel, the trolleys 5 pass initially into the first compartment 24 and then, in the manner provided to minimize connection of the inside of the tunnel to the outside, along the drying and preheating chamber 20. The introduction inside the drying and preheating chamber 20 of the fumes arriving from the radiating bodies 50 through the duct 53 ensures that a temperature substantially between 120° C. and 250° C. is maintained inside the drying and preheating chamber. A substantially complete drying of the wood products and their preheating are achieved at this temperature. The drying and preheating of the wood products generate a gas that is constituted substantially entirely by water vapor, and is used, mixed with the exhaust fumes of the exchangers, as already explained, to adjust the temperature of the fumes arriving from the radiating bodies 50 prior to their introduction in the drying and preheating chamber 20. Another part of this gas is extracted through the duct 58 and used to adjust the temperature of the fumes arriving from the combustion chamber 52 before they are fed into the radiating bodies 50.

This adjustment is performed so that the fumes at the inlet of the radiating bodies 50 have a temperature of approximately 900° C., so as to maintain, inside the pyrolysis chamber 21, a temperature that is preferably substantially between 300° C. and 600° C., most preferably between 400° C. and 500° C.

After the drying and preheating chamber 20, the wood products are fed, by virtue of the intermittent advancement of the trolleys 5 in the tunnel 2, into the pyrolysis chamber 21, where the wood products contained in the trolleys 5 are heated indirectly, achieving their pyrolysis, i.e., the thermochemical decomposition of the organic matter constituting the wood products. The products of this thermochemical reaction, which occurs practically in the absence of air, are constituted by the charcoal that remains in the trolleys 5 and by a gaseous phase that is removed from the pyrolysis chamber 21 through the duct 61. The gaseous phase is in turn formed by a condensable component and by a noncondensable component.

The condensable component substantially contains water, tars, pitches, aliphatic and/or aromatic hydrocarbons, organic acids, alcohols, ketones, aldehydes, and the noncondensable phase substantially contains hydrogen, light hydrocarbons, carbon monoxide, and carbon dioxide.

The gaseous phase is sent, through the duct 61, directly to the combustion chamber 52 and, if an excess of this gaseous phase with respect to the self-sustenance requirements of the process occurs, the excess part is burned in the additional combustion chamber 73.

As already explained, part of the gaseous phase taken from the pyrolysis chamber 21 is conveyed, through the duct 61a, to the battery of condenser cyclones 63–66, where the condensable component is separated from the noncondensable component.

The condensable component is collected in the tank 67, whereas the noncondensable component is conveyed through the duct 68 into the cooling chamber 22.

After a retention time allowing complete pyrolysis of the wood products, the trolleys 5 carry the wood products into the cooling chamber 22, where the introduction of the cooled noncondensable component and the optional spraying of water through the sprayers 72 lowers the temperature of the charcoal below 100° C., so as to safely avoid any spontaneous combustion of the charcoal when exiting from the tunnel.

Finally, the trolleys with the charcoal produced by the pyrolysis of the wood products are removed from the tunnel, emptied of the charcoal, repositioned at the inlet of the tunnel 2, and then filled with fresh wood products to be carbonized. It should be noted that although the advancement of the trolleys 5 inside the tunnel 2 is intermittent, the charcoal production process is practically continuous.

In practice the preferred method is self-sustained energywise, since the energy required to achieve pyrolysis of the wood products is produced by the combustion of the gases generated from the pyrolysis process.

The only additional energy input is constituted by an auxiliary supply provided in the combustion chamber 52 with external fuel, constituted for example by methane, to start the apparatus and to adjust the temperature of the fumes produced.

The retention time of each trolley inside the tunnel 2 varies as a function of the moisture, size, and type of the wood products subjected to pyrolysis. All the process parameters, temperatures, and pressures, are controlled by an automatic regulation system.

In practice it has been observed that the preferred method and apparatus according to the invention advantageously allow to produce charcoal with practically no consumption of the wood products and therefore with high efficiency.

The sensible heat of the fumes that is transmitted to the raw material, both by direct contact in the drying and preheating chamber, and indirectly by means of the radiating exchangers in the pyrolysis chamber, effectively avoids the mixing of the gases produced by wood pyrolysis, preventing water, carbon dioxide, and nitrogen from reducing the heat value thereof and preventing oxygen from contributing to their combustion. Accordingly, optimum thermal efficiency, high productivity of wood charcoal, and overall recovery of concentrated pyroligneous products are achieved.

Although the preferred method and apparatus according to the invention have been studied particularly for the production of charcoal by using wood products as raw material, they can in any case be used to produce charcoal starting from vegetable biomasses in general.

The preferred method and apparatus thus conceived are susceptible of numerous modifications and variations, all of which are within the scope of the inventive concept; all the details may furthermore be replaced with other technically equivalent elements.

In practice, the materials employed, as well as the dimensions, may be any according to the requirements and the state of the art.

What is claimed is:

1. Method for producing wood charcoal by pyrolysis of wood products, or vegetable biomasses in general, comprising the steps of: loading the wood products onto transport trolleys; introducing said trolleys, which contain the wood products, in a treatment tunnel in which a pyrolysis chamber is formed; indirectly heating the wood products inside said pyrolysis chamber until pyrolysis of the wood products is obtained, with continuous extraction, from said pyrolysis chamber, of the gas generated by the pyrolysis process; and extracting the trolleys from said tunnel to unload from the trolleys the charcoal that constitutes the residue of the pyrolysis of the wood products.

2. Method according to claim 1, further comprising the step, prior to the heating step, of drying and directly preheating the wood products in said tunnel in a drying and preheating chamber located upstream of said pyrolysis chamber relative to the advancement direction of the trolleys along said tunnel.

3. Method according to claim 2, wherein during the drying and preheating step the wood products are heated with a gas to a temperature that is substantially between 120° C. and 250° C.

4. Method according to claim 1, wherein during said heating step the wood products are heated to a temperature that is substantially between 300° C. and 600° C.

5. Method according to claim 1, wherein during the heating step the wood products are heated to a temperature that is substantially between 400° C. and 500° C.

6. Method according to claim 1, further comprising the step, after the heating step and prior to the extraction step, of cooling the charcoal produced by the pyrolysis of the wood products in a cooling chamber located in said tunnel downstream of said pyrolysis chamber relative to the advancement direction of the trolleys along said tunnel.

7. Method according to claim 6, wherein during the cooling step the charcoal is brought to a temperature of less than 100° C.

8. Method according to claim 1, wherein the heating of the wood products, during the heating step, is performed by means of radiating bodies arranged in said pyrolysis chamber.

9. Method according to claim 8, wherein the gas extracted from said pyrolysis chamber is used as fuel in a combustion chamber, the fumes that leave said combustion chamber being fed into said radiating bodies.

10. Method according to claim 9, wherein the fumes that leave said radiating bodies are fed into said drying and preheating chamber.

11. Method according to claim 10, wherein part of the gases that leave said drying and preheating chamber is mixed with the fumes that leave said radiating bodies prior to feeding them into said drying and preheating chamber to adjust the temperature of the fumes fed into said drying and preheating chamber.

12. Method according to claim 11, wherein part of the gases that leave said drying and preheating chamber is mixed with the fumes that leave said combustion chamber to adjust the temperature of the fumes fed into said radiating bodies in the pyrolysis chamber.

13. Method according to claim 8, wherein the temperature of the fumes fed into said radiating bodies is substantially 900° C.

14. Method according to claim 1, wherein part of the gas generated by the pyrolysis process is subjected to separation of the condensable part from the noncondensable part, said noncondensable part being used as direct-cooling fluid and being fed into said cooling chamber.

15. Method according to claim 14, wherein the tars produced by the condensation of said condensable part are fed back into the trolleys in said tunnel upstream of said pyrolysis chamber to be redistilled.

16. Apparatus for producing vegetable charcoal by pyrolysis of wood products, or vegetable biomasses in general, comprising: a treatment tunnel; means for moving, along said tunnel, trolleys for loading the wood products to be treated; means for separating the inside of said tunnel from the outside environment; at least one pyrolysis chamber being formed in said tunnel, said pyrolysis chamber being provided with means for the indirect heating of the wood products, which are introduced in said pyrolysis chamber, to a temperature adapted to achieve the pyrolysis of said wood products; and means for extracting from said pyrolysis chamber the gas generated by the pyrolysis process.

17. Apparatus according to claim 16, wherein said tunnel lies on a substantially horizontal plane and is substantially U-shaped, with an inlet and an outlet that are arranged on a same side of the tunnel.

18. Apparatus according to claim 16, wherein in said tunnel, upstream of said pyrolysis chamber relative to the advancement direction of said trolleys along said tunnel, a drying and preheating chamber is provided that is separated from said pyrolysis chamber and from the outside environment by at least one door that is movable on command to allow the transit of the trolleys.

19. Apparatus according to claim 16, wherein in said tunnel, downstream of said pyrolysis chamber relative to the advancement direction of said trolleys along said tunnel, a chamber for cooling the charcoal produced by the pyrolysis of the wood products is provided, said cooling chamber being separated from said pyrolysis chamber and from the outside environment by at least one door that is movable on command to allow the transit of the trolleys.

20. Apparatus according to claim 16, wherein said indirect heating means comprise a battery of radiating bodies having a tubular structure, located in said pyrolysis chamber, and connected to the outlet of the fumes of at least one combustion chamber.

21. Apparatus according to claim 16, wherein said means for extracting the gas generated by the pyrolysis process comprise an extraction duct extending from said pyrolysis chamber and feeding a burner of said combustion chamber.

22. Apparatus according to claim 20, wherein said radiating bodies are connected to ducts for introducing the fumes into said drying and preheating chamber.

23. Apparatus according to claim 16, further comprising a first duct for collecting the drying gas and the vapor generated by the wood products in said drying and preheating chamber, said first duct for collecting the gas in said drying and preheating chamber being connected, through an adjustment valve, to a duct for feeding the fumes into said drying and preheating chamber, said duct being connected to said radiating bodies to adjust the temperature of the fumes fed into said drying and preheating chamber.

24. Apparatus according to claim 18, wherein at the inlet of said drying and preheating chamber there is provided a compartment that is separated from the remaining part of said drying and preheating chamber by a movable door, another compartment being provided proximate to the outlet of said cooling chamber and being separated from the remaining part of said cooling chamber by a movable door, said two compartments being kept at the equilibrium pressure by aspirating exhaust gases from said two compartments and feeding them therein.

25. Apparatus according to claim 24, further comprising a second duct for collecting the gas arriving from said drying and preheating chamber, said second duct for collecting the gas in said drying and preheating chamber being connected, through an adjustment valve, to the duct for the fumes that leave said combustion chamber, which feeds said radiating bodies to adjust the temperature of the fumes fed into said radiating bodies.

26. Apparatus according to claim 16, further comprising means for separating the condensable component from the noncondensable component of part of the gas produced by the pyrolysis of the wood products in said pyrolysis chamber.

27. Apparatus according to claim 26, wherein said separation means comprise at least one condenser cyclone the inlet whereof is connected to said extraction duct.

28. Apparatus according to claim 27, wherein said condenser cyclone is connected to said cooling chamber with one of its noncondensable gas outlets.

29. Apparatus according to claim 28, further comprising a duct for collecting the gas for cooling the charcoal in said cooling chamber, said duct for collecting the gas in said cooling chamber being connected to the inlet of said at least one condenser cyclone.

30. Apparatus according to claim 16, further comprising an additional combustion chamber with a burner that is supplied with the gas, produced by the pyrolysis of the wood products, that is in excess with respect to the energy required to make the pyrolysis process self-sustaining.

31. Apparatus according to claim 30, further comprising a tank for treating the condensable component of the gas produced by the pyrolysis of the wood products.

32. Apparatus according to claim 31, further comprising a cyclone chimney connected to the duct for discharging the fumes emitted by said additional combustion chamber and to said second duct for collecting the gas in said drying and preheating chamber to dispose of the excess gases.

33. Apparatus according to claim 30, wherein said combustion chamber is provided with a burner for startup and temperature adjustment.

34. Apparatus according to claim 16, wherein said means for moving said trolleys comprise a rail that runs along said tunnel and means for the intermittent advancement of said trolleys along said tunnel on said rail.

* * * * *